Jan. 2, 1923.

J. J. MIKSHEL.
FRICTION CUTTING MACHINE.
FILED Nov. 22, 1919.

Inventor
John J. Mikshel.
By: William W. Hall
Atty.

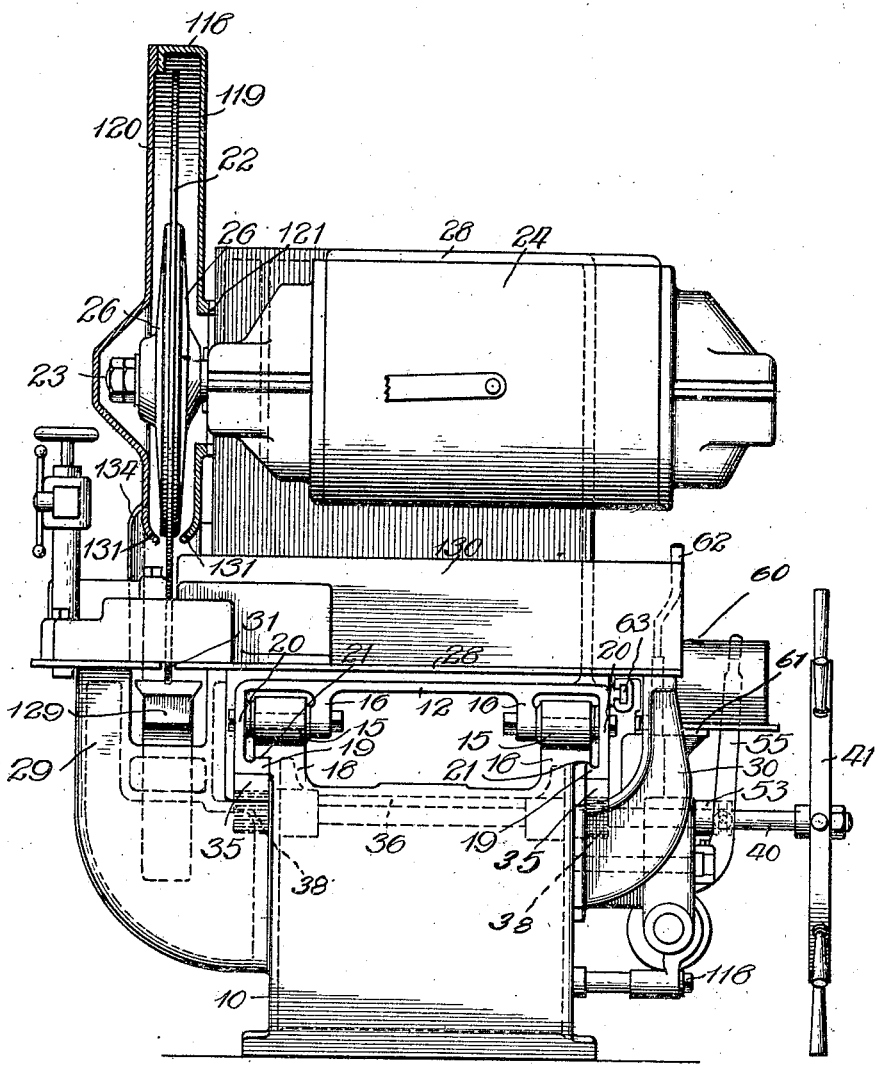

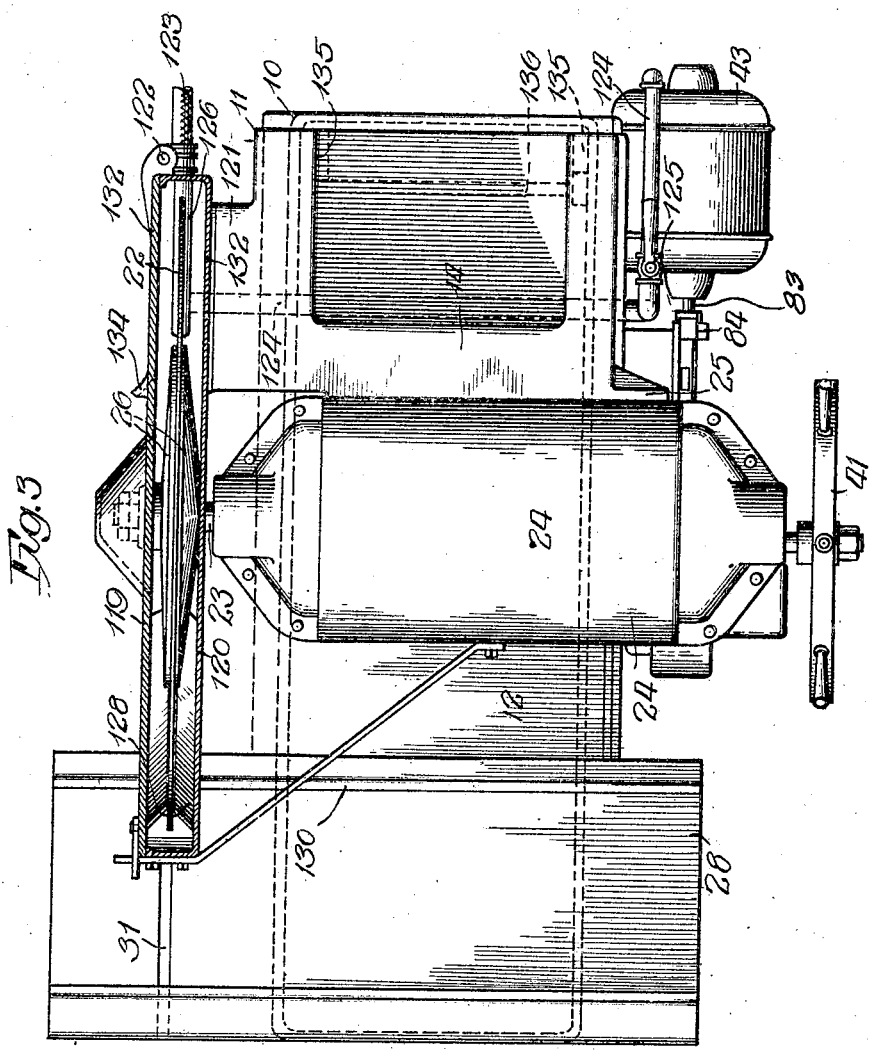

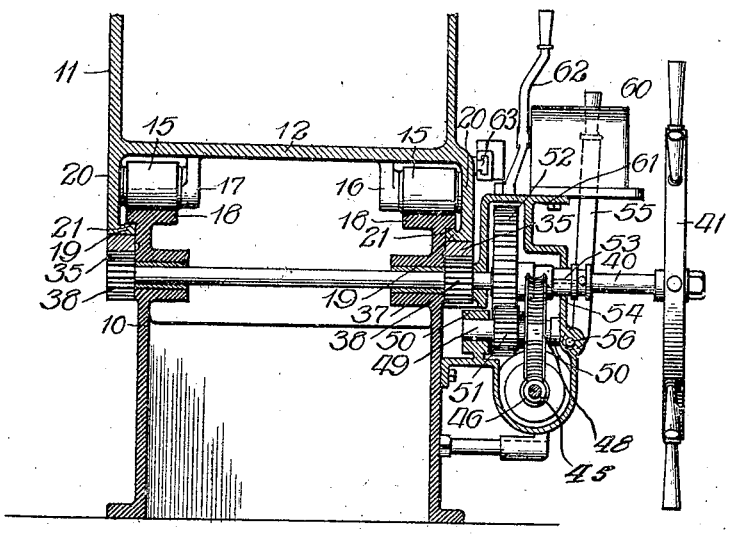
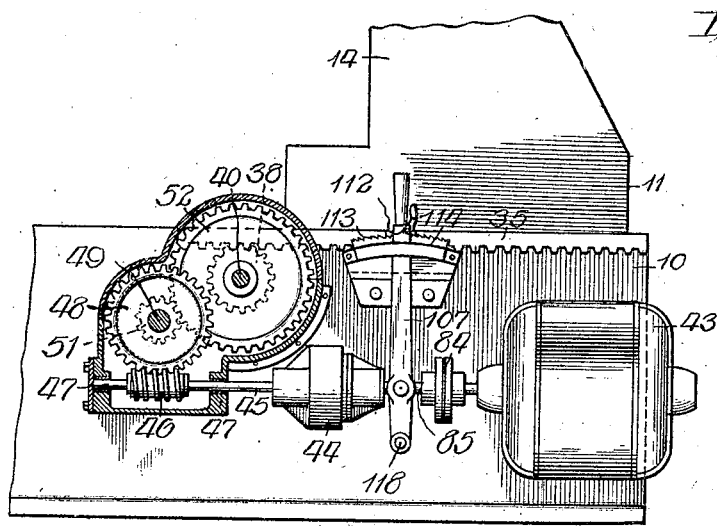

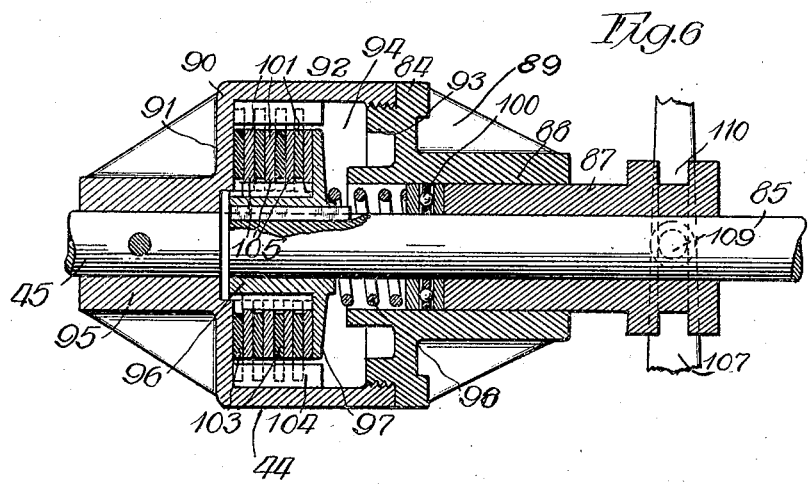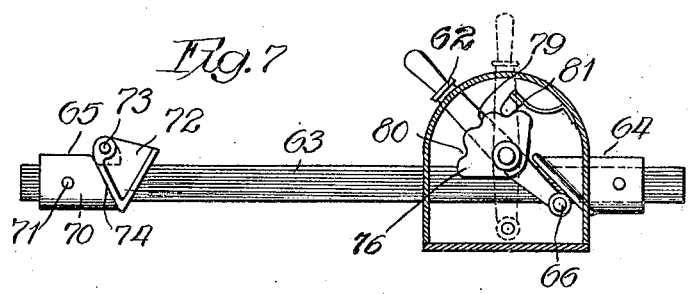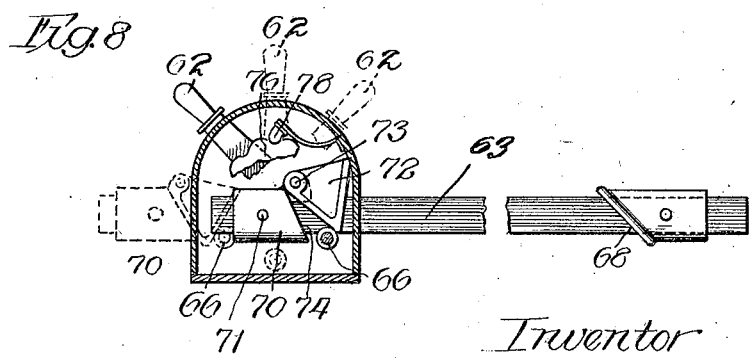

Patented Jan. 2, 1923.

1,440,616

UNITED STATES PATENT OFFICE.

JOHN J. MIKSHEL, OF CHICAGO, ILLINOIS, ASSIGNOR TO JOSEPH T. RYERSON & SON, A CORPORATION OF ILLINOIS.

FRICTION CUTTING MACHINE.

Application filed November 22, 1919. Serial No. 340,065.

*To all whom it may concern:*

Be it known that I, JOHN J. MIKSHEL, a citizen of the United States, and a resident of Chicago, in the county of Cook and State of Illinois, have invented certain new and useful Improvements in Friction Cutting Machines; and I do hereby declare that the following is a full, clear, and exact description thereof, reference being had to the accompanying drawings, and to the characters of reference marked thereon, which form a part of this specification.

This invention relates to improvements in friction saw machines for sawing metal; and is herein shown as adapted to that character of friction saws known as high-speed saws, wherein the metal is cut or parted by fusion thereof effected by a rapid travel of the periphery of the blade against the metal, such, for instance, as the friction saw machine illustrated in the prior patent to Edward T. Hendee, No. 1,185,095, granted on the 30th day of May, 1916.

Among the objects of the present invention is to so construct the carriage by which the saw blade, which is directly connected to the motor shaft, and the motor that the said saw blade and motor are so balanced relatively to the carriage as to minimize vibration of the saw blade when in operation.

Another object of the invention is to construct the carriage and to mount it on the machine base in such a way as to materially reduce the effective length of the carriage and thereby reduce the length of the base or frame on which the carriage is mounted and also reduce the weight of these parts.

A further object of the invention is to provide an improved transmission drive connection between a feed motor, mounted on the machine frame, and the saw blade driving mechanism as to control the feed speed of the saw blade to correspond with the work through which the blade is cutting so as to thereby avoid overloading the saw blade driving motor, the construction and arrangement being such that when the load on the saw blade is small, as when cutting through relatively thin material, the feed speed of the saw is greater than when the saw blade is cutting through heavier sections of material, so that thereby the peripheral travel of the saw blade may be maintained approximately constant when cutting through different cross sections of material.

A further object of the invention is to provide novel means of supplying cooling water to the saw blade in such a way as to avoid flushing the saw blade at the point where it is cutting through the material, and thereby avoid an objectionable cooling of the work through which the saw blade is cutting.

Another object of the invention is to control the sparks thrown rearward by the saw and to direct them to the cooling water drain portion of the hood.

Another object of the invention is to provide an improved means of controlling the travel of the carriage at the back limit of its travel, the controlling mechanism co-operating with a feed motor control in such a way that the carriage or table is permitted to gradually slow down after the control mechanism has thrown the controller to neutral.

Other objects of the invention are to improve and simplify friction saw machines of the general character described, and the invention consists in the combination and arrangement of the parts shown in the drawings and described in the specification, and is pointed out in the appended claims.

In the drawings:

Figure 2 is a front elevation thereof.

Figure 3 is a plan view of the machine.

Figure 4 is a vertical section of the machine showing the driving mechanism.

Figure 5 is a fragmentary side elevation showing the driving mechanism from the feed motor to the carriage table.

Figure 6 is an axial section of a portion of the saw feed driving mechanism.

Figures 7 and 8 are details of the tripping dogs which are movable with the carriage or table for throwing the feed motor controller mechanism to neutral at the limits of travel of the carriage.

Figure 1:
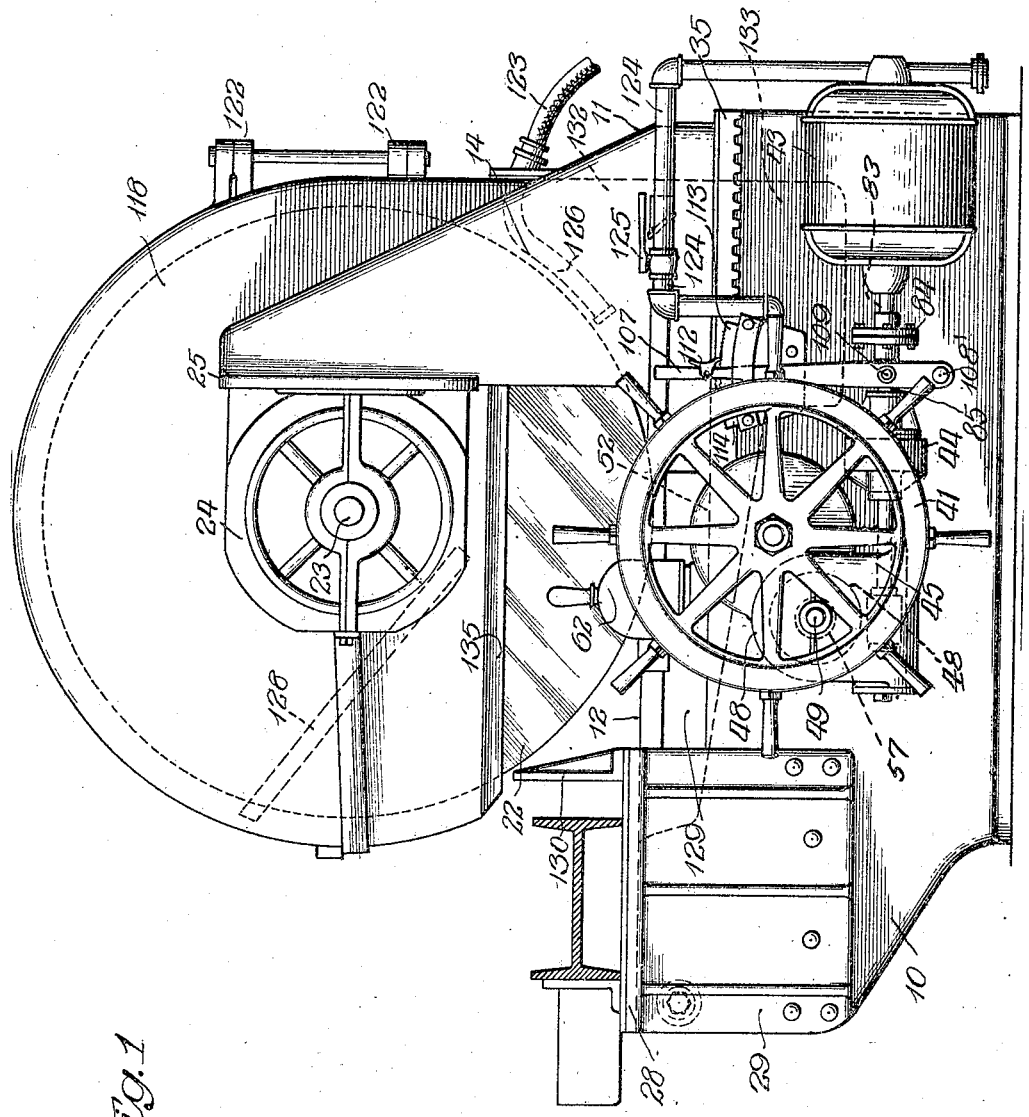
Figure 1 is a side elevation of a friction saw machine embodying my invention.

As shown in the drawings, 10 designates the base of the machine which may be made of any suitable shape or construction to support the carriage and the operative elements. 11 designates as a whole the saw blade supporting carriage or table, which is supported on the base. In accordance with the present invention said carriage comprises a horizontal portion 12 which may be made hollow, as most clearly shown in Figure 4, and an upstanding bracket 14 which is located at the rear of the horizontal portion 12 of the carriage. Said carriage is supported on the base through the medium of rollers 15, 15, the shafts of which are mounted in the sides of the carriage and in brackets 16 and 17 depending therefrom, said rollers resting and rolling on instanding tracks 18 at the sides of the base. The rollers 15 support the load of the carriage when at rest and in operation, and the carriage is prevented from raising from the base by means of instanding flanges 19 which are formed on the depending portions or aprons 20 of the carriage outside of the base, said instanding flanges facing upwardly to constitute at their upper faces slide bearings that bear against downwardly facing tracks 21 which are formed at the outer sides of the roller tracks 18 above referred to.

22 designates the saw or blade which is directly mounted on the shaft 23 of the motor 24. Said motor is fixedly bolted to a pad 25 which is formed on the rear face of the standard 14, said standard and its pad constituting a wall mounting for the motor, generally similar to the construction shown in the aforesaid patent to Hendee. The saw blade is located in a plane just outside of the carriage and base, and is fixed on the motor shaft 23 through the medium of clamping plates or spiders 26 of a diameter to embrace the saw a substantial distance beyond its axis of rotation. The said motor 24 is fixed to the bracket or support 14 at one side of the vertical center of the bracket so that the center of gravity of the combined weight of the motor and the saw blade is near the center of gravity of the entire carriage load mass. 28 designates a work supporting table which is mounted at the rear end of the saw frame on brackets 29, 30, which are bolted to the base at the sides thereof and rise a distance above the base. The said support extends laterally beyond the frame and carriage at the saw blade side of the machine, and is transversely slotted at 31 to receive the saw blade. The brackets 29, 30 sustain the work support 28 above the plane of the carriage such distance as to permit the rear horizontal portion 12 of the carriage to pass beneath the work support when the carriage and the saw blade carried thereby are at the limit of cutting travel; said work support being provided with means of any suitable character to hold the work in place while the saw blade is cutting therethrough.

A feature of the invention to be observed, and which will be clear from what has been said, is that the motor and the saw blade are located centrally with respect to the length of the carriage, this construction contributing to bringing the mass weight of the carriage, the saw, and motor near the longitudinal center of the carriage. Thereby, this construction and arrangement, in connection with fixing the motor to the upstanding bracket laterally at one side of the center of the bracket, has the effect to balance the moving parts of the machine, to-wit, the carriage, the motor, and the saw blade so that, in the first place, vibration of said parts, due to the impact of the saw against the work and to the high speed of the saw, is reduced to a minimum, and, secondly, it becomes thereby possible and practicable to materially lessen the length of the carriage, and also lessen the tendency of the contact of the saw blade with the work tipping the carriage upwardly, especially when the saw first attacks the work. These features of construction thereby enable the saw to be operated with less power, due to the balancing of the operative parts, lengthens the life of the saw, due to the minimized vibration in operation, and substantially reduces the material necessary to construct the base and carriage, and thereby greatly reduces the cost of the saw machine. The carriage is operated to feed the saw blade and its operating motor towards and away from the work by means made as follows:

35, 35 designate rack bars which are attached to the said depending aprons 21 of the carriage, one at each side and exterior to the base. 36 designates a feed shaft which extends transversely across the base and is rotatively mounted in bearings 37 fixed to the base. Said feed shaft carries pinions 38, 38 which mesh with the racks 35. The feed shaft 36 may be rotated by hand or motor power. It may be driven by hand power by extending the feed shaft 36 beyond one side of the frame as indicated at 40 and applying an operating hand wheel 41 thereto. The power mechanism for operating the shaft 36 and thereby causing the carriage to move towards and from the work is shown as made as follows:

43 designates a feed motor of comparatively small horsepower that is bolted or otherwise fixed to the base 10 at the side of the machine. The shaft of said motor is connected through a friction drive mechanism designated as a whole by 44, and hereinafter more fully described, to a shaft 45, on which is fixed a worm 46, the shaft 45 being mounted in suitable bearings 47. The worm 46 meshes with a worm gear 48 that rotates on a shaft 49 mounted in suitable bearings 50. Mounted also on said shaft is a pinion 51 that meshes with a gear 52 that normally is free to rotate on the extension 40 of the carriage operating shaft 36 but is adapted to be locked thereto by a suitable clutch mechanism. As herein shown the clutch mechanism embraces a clutch collar 53 which is splined to the shaft extension 40 and is provided with clutch teeth adapted to engage corresponding clutch teeth on the hub 54 of said gear wheel 52. The said clutch collar or sleeve 53 so splined to the extension 40 is adapted to be shifted endwise on said extension by means of a shifter lever 55 which is hinged at 56 to a portion of the casing which encloses the gears and has pin and groove connection with said clutch collar which permits the latter to turn without turning the shifter lever. Thus it will be seen that when the shifter lever 55 is thrown or swung toward the machine frame a driving connection is established between the clutch elements 53 and 54, whereby the motor 43 is directly connected to the shaft 36 to operate the table or carriage.

The operation of said feed motor 43 may be controlled by any familiar form of starting box or controller 60 which is mounted on a fixed part of the frame, as by means of a bracket 61 herein shown, that may be an integral part of the gear casing or housing. This controller may be a drum type controller actuated by hand through the medium of a controller lever 62. Preferably and as herein shown, tripping means move with the carriage for throwing the controller lever from either its forward or backward adjustment to neutral when the carriage reaches the limit of its movement in either direction. This is shown as accomplished by means of a bar 63 which is fixed to the carriage to travel therewith and tripping dogs 64, 65, respectively, that are adapted for longitudinal adjustment along the bar 63, and each adapted for engagement with a roller 66 on an extension of the controller lever below its point of pivot for throwing the lever from a running position to neutral. As herein shown, the tripping dog 64 is provided with an oblique tripping face 68 adapted when the carriage is at the forward limit of its travel to engage said roller 66 of the controller lever in the manner indicated in Figure 7 and thereby, at the end of the feed travel of the carriage, to throw the controller lever to its neutral position, as indicated in dotted lines in Figgure 7.

The tripping dog 65 is of special construction to permit the carriage to float past the point at which the controller is thrown to neutral, the construction of the latter dog being such as not to interfere with the subsequent manual operation of the controller lever to feed the carriage towards the work and to enable parts of said tripping dog to pass the controller lever roller as the carriage proceeds ahead. The tendency of the carriage to drift or float forwardly after the controller lever is thrown to neutral is due to the high speed of the return carriage travel and also to the momentum of the mass acquired at such return speed. For the purpose described the tripping dog 65 embraces in addition to the member 70 that may be adjusted along the bar 63, as by the set screw 71, a swingable, generally triangular member 72 that is hinged at 73 at the front end of the member 70. Said member 70 constitutes an abutment and is formed with an oblique face 74 against which the corresponding oblique face of the active tripping dog member 72 normally rests, as shown in Figure 7, the tripping dog member 72 extending at its point somewhat below the lower end of the oblique face 74 of the abutment 70. Thus when the carriage is returning at high speed, the tripping dog member 72 strikes the roller 66 of the controller lever when the controller lever assumes its forward inclination indicated by dotted lines in Figure 8, or the position at which the lever was theretofore thrown to reverse the motor to cause the carriage to travel backwardly. As the controller lever assumes its neutral vertical position indicated by the vertical dotted lines in Figure 7, the tripping dog 72 and the abutment 70 will ride over the roller 66 as it travels through the downward arc to the position indicated in the dotted lines in Figure 8, which is the neutral position of the controller lever and its roller 66. The passing of the tripping dog 72 past the plane of the neutral position of the controller lever, therefore leaves said lever in its neutral position, with no tendency to swing said lever to a position to start the carriage forwardly towards its work. When the controller lever is swung forwardly, as indicated by the full line position in Figure 8, to start the carriage ahead, the tripping dog member 72 will not interfere with the adjustment of the controller lever, inasmuch as the hinge of the tripping dog member 72 permits the latter to be first raised as indicated in Figure 8 and to afterwards ride over the roller 66 of the controller member as the carriage advances.

In order that the controller lever 62 may be held reliably in its neutral or either of its ahead or reversing positions, which may tend to be displaced by reason of vibration of the machine, the said lever may be provided with a plate 76 (Figures 7 and 8) having peripheral notches to be engaged by a spring-held holding dog 78 fixed to the controller casing, there being a central notch 79 to co-act with the dog to hold the controller lever in neutral position and side notches 80, 81 co-operating with the dog to hold the lever in its respective forward and reverse positions.

Referring to the friction drive mechanism by which the forward speed of the carriage and the saw blade is controlled to correspond to the load against which the saw blade is driven, said control mechanism is best shown in Figures 1, 5, and 6 and is made as follows:

The shaft 83 of the feed motor 43 is connected by a coupling 84 to the driving shaft 85 of the friction control device; and said latter shaft is connected through a friction control device to the drive shaft 45, before referred to, which constitutes part of the train of the driving mechanism for the traveling carriage. Said shaft 85 extends loosely through a sleeve 87 which is rotatively mounted in a bearing portion 88 of the friction control casing comprising two members 89, 90. The member 90 of said casing embraces an end wall 91 and a cylindric flange or shell 92 which latter is internally threaded to engage complemental threads on an annular flange 93 of the member 89, the two members thus connected enclosing a chamber 94 into which the driving shaft 85 extends and which receives oil to immerse the friction elements of the drive, now to be described.

The transmission shaft 45 which carries the worm 46 extends into a sleeve portion 95 of the member 90 of said casing and is pinned or otherwise non-rotatively secured thereto to constitute a driven shaft. Splined on the end of the shaft 85 within the chamber 94 is a sleeve 96 which is formed at its end remote from the shaft 45 with a heavy flange 97. Arranged between said flange 97 and the end wall 91 of the casing member 90 are a plurality of discs which are adapted to be pressed together by a heavy backing spring 98 which surrounds the shaft 85 and is interposed between the flanged sleeve 96 and a thrust bearing 100 that lies against the inner end of the sleeve 87. The said friction discs are alternatively connected to the sleeve 96 and the cylindric shell portion 92 of the casing. They comprise rings or discs 101 (Figure 6) which are notched at their inner peripheries to interlock with longitudinal external ribs on the sleeve 96, and other rings or discs 103 that are notched at their outer peripheries to interlock with other ribs 104 carried by the cylindric shell portions 92 of the casing. It will thus be noted that the discs 101 are driving discs which rotate with the driving shaft 85 and that the discs 103 are driven discs, being interlocked to the casing 90 and therethrough to the shaft 45. Said driving and driven discs are made of metal having a high co-efficiency of friction with respect to each other, bronze and steel, respectively, being used in practice. The said driving and driven discs are adapted to be spring-pressed together between the flange 97 and the end wall 91 of the casing by means of a lever 107 that may be hinged to any fixed portion of the machine, as at 108 and is provided with pins 109 that engage in a groove 110 of an enlarged part of the sleeve 87 (Figures 1 and 5). Therefore, when the lever is swung to the left, as shown in Figure 1, the sleeve 87 is forced inwardly and acts through the spring 98 to increase the pressure between the driving and driven discs; and this pressure will be adjusted relatively to a safe load on the saw blade operating motor 24. If this predetermined load on the saw blade operating motor be exceeded, there will be a slippage between the friction discs of the friction drive described, so as to slow down the carriage travel and thus relieve the saw blade operating motor until the cross section of the work is such that the blade may be safely fed faster into the work, whereupon the pressure among the friction discs will transmit the full driving power of the feed motor 43 to the carriage. It has been found that this friction drive connection between the motor and the table is very sensitive to control the feed of the saw blade to the work and prevent an overload on the saw beyond a predetermined safe overload. The said friction control lever is adapted to be locked in a given adjustment by a spring-held dog 112 on the lever 107, which is adapted to engage an arc shaped series of teeth 113 on a curved bar 114 fixed on the machine base, as shown in Figure 5; and the spacing of the teeth and the leverage of the controller lever are such as to give very delicate pressure control on the power transmission discs.

The saw blade is enclosed in a hood 118 comprising the two parts 119, 120, the former of which is fixed to an extension 121 of the carriage and the latter of which is hinged at 122 to the fixed portion so that it may be swung away from the saw blade when a blade is to be replaced, or for other purposes. Cooling water is delivered on the saw in the hood through a pipe 123, which preferably has the form of a flexible hose, that is connected to a pipe 124 which leads from a source of water supply, and is provided with a cut-out valve 125. The pipe 123 terminates inside the hood in a curved perforated spray head 126 which is located in rear and below the axis of rotation of the saw blade, corresponding in curvature to the saw blade periphery and spaced a suitable distance therefrom. Said spray head may be located in the plane of the saw blade and may be provided with a row of spray apertures to direct the cooling water or other medium against the saw blade at its cutting edge. In order to prevent the cooling water, which tends to cling to the blade, being carried by the saw blade directly to the work, downwardly and forwardly inclined deflectors 128 are attached to the inner side of the hood members in the manner most clearly indicated in Figures 1 and 3, and these deflectors are located with their edges close to the opposite sides of the saw blade so as to deflect or scrape the film of water that tends to adhere to the saw blade and to direct the water thus deflected downwardly and backwardly away from the cutting edge of the saw blade and the work and to a drain trough 129 below the plane of the carriage, so that cooling water in large quantities will not find its way to the part of the work through which the saw blade is cutting. Thereby the cooling influence of the water is applied to the margin of the saw blade closely adjacent to the point where the blade emerges from the work and cools the blade from that point abreast the deflectors 128 which has the effect to sufficiently cool the saw blade margin, and the deflector, as before stated, prevents the water being thrown in large volume on the work with a tendency to chill the work and thereby hinder the cutting action of the saw blade to such extent as to decrease the cutting efficiency of the saw blade thereon. Some water will find its way to the work table, however, and in order to prevent this water and sparks finding their way backwardly over the work table and on to the mechanism in rear thereof an upright water shield 130 is provided which rises from the table throughout the width thereof and is so arranged as to intercept the sparks and to direct the water towards and off the end of the table into said trough 129.

The lower marginal portions of the hood members above the vertical work clearance turn inwardly as at 131 (Figure 2) to catch part of the water that clings to the saw blade forwardly beyond the deflectors being thrown downwardly on to the work support. The water trough 129 is connected to the hood members by the vertical spaced portions 132 that connect at the lowermost portions 133 thereof (Figure 1), and in order to prevent sparks being thrown past the rear edge of the vertical portion 132 a deflector 134 (Figures 2 and 3) is formed on and turns out laterally from the vertical rear margin of the outer member 132, the sparks tending to be thrown rearward from the cutting edge of the blade in a flaring fashion.

In order to prevent the saw running rearwardly on the frame to a distance that would demesh the driving racks 35 from the pinions 38, stops 135 are provided at the rear end of the frame in the path of a bar 136 of any suitable construction on the carriage. Should the carriage be floating away from the work after the controller lever has been thrown to neutral the friction drive between the feed motor and carriage driving gear would tend to absorb the inertia of the table after said stops 135 and 136 were brought together.

While the improvements herein disclosed have been described with particular reference to a high-speed friction saw, it is to be understood that some of them may be adapted to saws or cutting machines of different types within the spirit and scope of the claims hereto appended. It will be furthermore noted that the invention is not limited to the particular structural details shown, except as to such claims wherein the details are specifically set forth and as imposed by the prior art, and that it is the intent to claim all of inherent novelty herein disclosed.

I claim as my invention,—

1. A metal friction cutting machine, comprising a frame, a carriage movable towards and from the working position and provided with a motor supporting member near one end of the carriage, a motor and a directly connected saw blade supported on said member, said carriage being of a length so constructed with respect to the attachment of the motor thereto and its support on the frame that the center of gravity of the motor and saw blade and carriage mass is substantially at the longitudinal center of the carriage.

2. A metal friction cutting machine comprising a frame, a reciprocable carriage movable towards and from the work and comprising a rear elevated motor mounting, and a forwardly extending horizontal member wholly in front of the motor mounting for support on the frame, a motor and a directly connected saw blade supported on said motor mounting, and means to give forward and reverse movement to the carriage.

3. A metal friction cutting machine comprising a frame, a reciprocable carriage movable towards and from the work and comprising a rear elevated motor mounting having a vertical wall mounting for a motor, and a forwardly extending horizontal member wholly in front of the motor mounting, a motor and a directly connected saw blade supported on said motor mounting, rollers on which said carriage is supported from the frame, and longitudinally extending sliding bearings on the carriage and frame to prevent the latter from rising relatively to the frame.

4. A metal friction cutting machine comprising a frame, a reciprocable carriage movable towards and from the work and comprising a rear elevated motor mounting, and a forwardly extending horizontal member wholly in front of the motor mounting, a motor and a directly connected saw blade supported on said motor mounting, said carriage being provided laterally exterior to the frame with depending aprons having toothed racks mounted thereon, a rotative shaft extending transversely across the frame, and pinions on said shaft meshing with said racks.

5. A metal friction cutting machine comprising a frame, a reciprocable carriage movable towards and from the work and comprising a rear elevated motor mounting, and a forwardly extending horizontal member wholly in front of the motor mounting, a motor and a directly connected saw blade supported on said motor mounting, and a work support elevated from the front end of said frame beneath which the front end of the horizontal member of the carriage is adapted to extend.

6. In a machine of the character described, a carriage adapted to travel on a base and formed at its rear end with an elevated motor mounting, a motor mounted thereon, and a saw blade directly connected to the motor, the carriage extending a substantial distance forwardly beyond the saw periphery.

7. In a machine of the character described, a carriage, a motor and directly connected saw blade, and a mounting for said motor rising from the rear of the carriage, and so disposed on the carriage that the carriage is principally in front of said mounting and the center of gravity of the motor, saw blade and carriage are disposed substantially at the longitudinal center of the carriage.

8. In a machine of the character described, a carriage, a motor and directly connected saw blade, and a mounting for said motor rising from the carriage, and so disposed on the carriage that the center of gravity of the motor, saw blade and carriage are disposed substantially at the longitudinal center of the carriage, the motor being horizontally mounted on the carriage with its center offset from the center of the carriage in a direction away from the saw blade.

9. A machine of the character set forth, comprising a base, a carriage movable thereon and embracing at its rear end an upstanding member and a forwardly extending horizontal portion wholly in front of said upstanding member, a motor and a directly connected saw blade supported on said upstanding member, and power means constructed and operating to delicately advance the carriage toward its work.

10. A machine of the character described, comprising a base, a work support at the front end thereof, and extending laterally beyond one side of the base, a carriage over the base comprising a rear upstanding bracket, and a horizontal member that is adapted to travel on the base with its front end beneath the front end work support, a motor carried by said bracket, and a saw blade directly connected to the motor and overhanging the carriage beyond the frame, said motor being attached to the bracket beyond the center of the bracket and on the side of the bracket opposite to the saw.

11. A metal friction cutting machine comprising a base frame, a carriage movable thereon towards and from the work and provided with a vertical motor mounting, having a mounting wall, and wholly in front of said mounting with a horizontal portion supported on the frame through roller bearings, a motor fixed to said motor mounting, and a saw blade directly connected to the motor, the arrangement being such that the center of gravity of the saw, the motor and carriage is disposed centrally of the carriage.

12. A metal friction cutting machine comprising a frame, a horizontal carriage movable thereon towards and from the work and provided at its rear end with a vertical motor mounting, and having in front thereof a horizontal portion, tracks on said frame, bearing rollers carried by the carriage and resting and rolling on said tracks, a motor fixed to said mounting, and a saw blade directly connected to the motor and overhanging the carriage and frame.

13. A metal friction cutting machine comprising a frame, a horizontal carriage movable thereon towards and from the work and provided at its extreme rear end with an elevated motor mounting and comprising also a lower horizontal, forwardly extending portion, a motor fixed to said mounting, a saw blade directly connected to the motor, laterally spaced tracks on the frame, rollers mounted on the carriage and resting on the said tracks to support the carriage, and co-acting sliding bearings on the carriage and frame to prevent the carriage from rising relatively to the frame.

14. A metal friction cutting machine comprising a base provided with laterally spaced upwardly facing tracks, a forward and rearwardly movable carriage provided with rollers which rest and roll on said tracks, said carriage being provided laterally exterior said rollers with depending aprons carrying downwardly facing, transversely spaced racks, a shaft extending across said base, pinions fixed to said shaft and meshing with said racks, and a motor and directly connected saw blade supported on said carriage.

15. A friction cutting machine comprising a base provided with laterally spaced, upstanding tracks, a carriage having rollers which travel on said tracks and provided laterally exterior to said rollers with longitudinal, upwardly facing bearings to engage downwardly facing bearings on said tracks to hold the carriage from rising, and a motor and directly connected saw blade mounted on the carriage.

16. A friction cutting machine comprising a base provided with laterally spaced, upstanding tracks, a carriage having rollers which travel on said tracks and provided laterally exterior to said rollers with downwardly extending aprons formed with longitudinal, upwardly facing bearings to engage downwardly facing bearings on the tracks, rack bars fixed to said aprons, carriage driving pinions meshing with said rack bars, and a motor and saw blade mounted on the carriage.

17. A friction cutting machine comprising a base frame provided with laterally spaced, upstanding tracks, a carriage having rollers which travel on said tracks and provided exterior to said rollers with downwardly extending aprons formed with longitudinal upwardly facing bearings to engage downwardly facing bearings on said tracks to hold the carriage from rising, said carriage being formed at its rear end with an upstanding motor mounting bracket and substantially in front thereof with a horizontal portion, a motor fixed to said motor mounting and a saw blade connected to the motor and overhanging one side of the carriage and frame.

18. A friction cutting machine comprising a base frame, a carriage supported by and reciprocable on the frame, a motor and directly connected saw blade supported on the carriage, and feed means for the carriage embracing a feed motor, gear mechanism operatively connected to the carriage, and a friction drive connected between said gear mechanism and the motor, constructed with means to maintain the working thrust of the saw blade uniformly against work of different resistance values.

19. A friction cutting machine comprising a base frame, a carriage supported by and movable on said frame, a motor and direct connected saw blade supported on the carriage, and feed means for the carriage embracing a feed motor, gear mechanism operatively connected to the carriage, and a friction drive connected between said gear mechanism and the motor comprising interleaned driving and driven discs for transmitting the feed motor power to the carriage.

20. A friction cutting machine comprising a base frame, a carriage movable thereon, a motor and direct connected saw blade supported on the carriage, and feed means for the carriage embracing a feed motor, gear mechanism operatively connected to the carriage, interleaned driving and driven discs connected between said motor and gear mechanism, and means for varying the pressure of said discs against each other to thereby vary the feed power that can be transmitted through said discs.

21. A friction cutting machine comprising a base frame, a carriage movable thereon, a saw supported by the carriage, and feed means for the carriage embracing a feed motor, gear mechanism operatively connected to the carriage, interacting driving and driven discs connected between said motor and gear mechanism and means for carrying the pressure of said discs against each other embracing a sleeve slidable on the feed motor shaft and provided with an operating element and a spring interposed between one end of said sleeve and the group of transmitting discs.

22. A friction cutting machine comprising a base frame, a carriage movable thereon, a saw blade carried by the carriage, and feed means for the carriage embracing a drive connection comprising interacting driving and driven discs connected between said motor and carriage, and means for varying pressure of said discs against each other embracing a sleeve slidable on the feed motor shaft and provided with a lever operated spring interposed between one end of the sleeve and the group of discs, and a fine toothed ratchet fixed to the frame adapted to be engaged by a locking dog carried by said lever.

23. The combination with a base frame, a carriage reciprocable thereon and a cutting tool carried by the carriage, of feed means to feed the carriage towards the work, embracing a feed motor and connections between the feed motor and carriage embracing multiple, interacting driving and driven discs with yielding means to force them against each other and constructed to maintain the cutting thrust of the tool on the work substantially constant regardless of the cross section of the work.

24. The combination with a base frame, a carriage reciprocable thereon and a cutting tool carried by the carriage, of feed means to feed the carriage towards the work, embracing a feed motor and connections between the feed motor and carriage embracing multiple, interacting driving and driven discs with yielding means to force them against each other.

25. A friction cutting machine embracing a base frame, a carriage supported by and movable on the frame and having an elevated motor mounting and a forwardly extending horizontal portion wholly in rear of said mounting, a motor fixed to said mounting, a saw blade directly connected to said motor and overhanging the side thereof, and feed means for the carriage, comprising a rack on the carriage, a driving gear meshing therewith, a driving shaft, and a friction shaft connected between said shaft and gear comprising interacting spring-pressed driving and driven discs.

26. A friction cutting machine comprising a base frame, a carriage reciprocable thereon, a rotary saw blade supported by the carriage, a hood enclosing the saw blade, a cooling water pipe extending into the hood and provided at the lower rear side of the blade with a spray head to direct a cooling medium thereon, and water deflector means in the hood to remove excess water from the blade above engagement of the blade with the work.

27. A friction cutting machine comprising a base frame, a carriage reciprocable thereon and a rotary saw blade carried by the carriage, a hood enclosing the saw blade, means to spray a cooling medium on the saw margin just after it leaves the work and downwardly and forwardly deflecting elements in the hood coacting with the blade just before it enters the work to direct excess cooling medium from the blade forwardly and downwardly away from the work support.

28. A friction cutting machine comprising a base frame, a carriage reciprocable thereon, a rotary saw blade carried by the carriage, a hood enclosing the saw blade, means to spray a cooling medium on the saw margin just after it leaves the work, downwardly and forwardly deflecting elements in the hood coacting with the blade just before it enters the work to direct excess cooling medium from the blade forwardly and downwardly away from the work support, and a drain trough into which the excess cooling medium is directed.

29. In a friction saw the combination with a carriage and a saw blade overhanging and carried by said carriage, of a hood enclosing the saw blade above the work clearance, means to spray cooling water on the margin of the saw blade as it emerges from the work and deflecting means to deflect the cooling water away from the saw blade margin before it enters the work.

30. In a friction saw the combination with a base frame having a work support, a carriage movable thereon and a saw blade supported on and overhanging the carriage, of a hood fixed to the carriage comprising a portion above the work clearance to enclose the saw blade, a trough below the level of the work clearance in the plane of the hood and connected to the hood, means to spray cooling water on the saw as it emerges from the work, and means within the hood to deflect water from the sides of the saw to the trough below.

31. In a friction saw the combination with a base frame having a work support, a carriage movable thereon and a saw blade supported on and overhanging the carriage, of a hood fixed to the carriage comprising a portion above the work clearance to enclose the saw blade, a trough below the level of the work clearance in the plane of the hood and connected to the hood, means to spray cooling water on the saw as it emerges from the work, and means within the hood to deflect water from the sides of the saw to the trough below, the lower marginal portion of the hood members being turned inwardly towards the saw.

32. In a friction cutting machine, the combination with a carriage and a saw blade supported on and laterally overhanging the carriage, of a hood enclosing the saw blade above the work clearance, a cooling water trough below and in the plane of the hood, and connected to the hood by upright members, one of said upright members being formed with a deflector to deflect sparks thrown rearwardly from the saw against the other said upright member.

33. In a friction cutting machine, the combination with a carriage and a saw blade supported on and laterally overhanging the carriage, of a hood enclosing the saw blade above the work clearance, a cooling water trough below and in the plane of the hood, and connected to the hood by upright members, one of said upright members being formed with a deflector to deflect sparks thrown rearwardly from the saw against the other said upright member, means to spray a cooling fluid against the saw blade just after it emerges from the work, and deflectors above the point of attack of the saw blade on the work to deflect excess water therefrom to said trough.

In witness whereof that I claim the foregoing as my invention I hereunto set my hand and affix my seal this 11th day of November, 1919.

JOHN J. MIKSHEL. [L. S.]